United States Patent [19]
Gellert

[11] Patent Number: 6,162,043
[45] Date of Patent: Dec. 19, 2000

[54] INJECTION MOLDING NOZZLE SCREWED INTO A MOUNTING BASE

[76] Inventor: Jobst Ulrich Gellert, 7A Prince Street, Georgetown, Ontario, Canada, L7G 2X1

[21] Appl. No.: 09/176,368

[22] Filed: Oct. 21, 1998

[30] Foreign Application Priority Data

Sep. 30, 1998 [CA] Canada ................................. 2248553

[51] Int. Cl.⁷ ................................................. B29C 45/22
[52] U.S. Cl. ...................... 425/549; 264/328.15; 425/572
[58] Field of Search ..................... 425/549, 572, 425/588; 264/328.15

[56] References Cited

U.S. PATENT DOCUMENTS

| | | |
|---|---|---|
| 4,268,240 | 5/1981 | Rees et al. ........................ 425/549 |
| 4,768,283 | 9/1988 | Gellert . |
| 5,268,184 | 12/1993 | Gellert . |
| 5,282,735 | 2/1994 | Gellert . |
| 5,429,491 | 7/1995 | Gellert . |
| 5,507,635 | 4/1996 | Gellert . |

FOREIGN PATENT DOCUMENTS 63-95923  4/1988  Japan ..................................... 425/549

*Primary Examiner*—Tim Heitbrink
*Attorney, Agent, or Firm*—Dalesman & Company

[57] ABSTRACT

Multiple nozzle injection molding apparatus wherein each heated nozzle is screwed into a socket in a mounting base secured in place adjacent a melt distribution manifold. Each heated nozzle extends through an opening in the manifold plate and has a nut-like engageable portion extending forwardly of the cavity plate. This allows each of the heated nozzles to be easily removed for cleaning or replacement without removing the cavity plate.

13 Claims, 2 Drawing Sheets

INJECTION MOLDING NOZZLE SCREWED INTO A MOUNTING BASE

BACKGROUND OF THE INVENTION

This invention relates generally to multiple nozzle injection molding apparatus and more particularly to such apparatus wherein each nozzle is screwed into a socket in a mounting base secured in place adjacent a melt distribution manifold.

Injection molding apparatus having a number of heated nozzles extending from a heated melt distribution manifold into a cooled mold are well known. U.S. Pat. No. 5,282,735 to Gellert which issued Feb. 1, 1994 shows the rear end of the heated nozzles being attached to the melt distribution manifold by being screwed into it. However, it is usually necessary to locate both the front and rear ends of the heated nozzle in the mold to allow the melt distribution manifold to move slightly laterally relative to the rear end of the nozzles to allow for heat expansion and contraction of the melt distribution manifold. This is usually done by securing a rear collar portion of the nozzle to the melt distribution manifold with screws which allow sufficient lateral movement to provide for thermal expansion and contraction. As shown, for instance in U.S. Pat. No. 4,768,283 to Gellert which issued Sep. 6, 1988, the collar portion is usually an integral part of the heated nozzle. However, as seen in U.S. Pat. No. 5,507,635 to Gellert which issued Apr. 16, 1996, the collar portion can be separable from the rest of the heated nozzle. In U.S. Pat. No. 5,268,184 to Gellert which issued Dec. 7, 1993, the nozzle has separate front and rear parts. Another variation of a removable collar portion having two segments held together by a retaining ring is shown in U.S. Pat. No. 5,429,491 to Gellert which issued Jul. 4, 1995. However, all of these previous configurations have the disadvantage that in order to remove one of the thermocouple or one of the nozzles for cleaning or replacement, it is necessary to first remove the mold from the molding machine and the manifold and cavity plates from the rear back plate.

SUMMARY OF THE INVENTION

Accordingly, it is an object of the present invention to at least partially overcome the disadvantages of the prior art by providing multiple nozzle injection molding apparatus wherein each heated nozzle is screwed into a mounting base which allows removal of the heated nozzles by removing only the cavity plate.

To this end, in one of its aspects, the invention provides injection molding apparatus having a heated melt distribution manifold and a plurality of heated nozzles mounted in a mold. Each heated nozzle has a threaded rear end and a melt bore extending therethrough to convey melt to a gate leading to a cavity. The melt distribution manifold has a front face and a melt passage extending therethrough. The melt passage has a number of branches extending outwardly from a common inlet portion to an outlet on the front face of the melt distribution manifold aligned with the melt bore extending through one of the heated nozzles. Each heated nozzle extends from a mounting base having a rear end abutting against the front face of the melt distribution manifold. Each mounting base has a frontwardly open threaded seat and a melt bore extending rearwardly therethrough from the threaded seat to the rear end. The rear end of each heated nozzle is screwed into the threaded seat of one of the mounting bases. The melt bore through the mounting base extends from one of the outlets of the melt passage to the aligned melt bore extending through the heated nozzle.

Furthers objects and advantages of the invention will appear from the following description taken together with accompanying drawings.

DETAILED DESCRIPTION OF THE INVENTION

Figure 1:
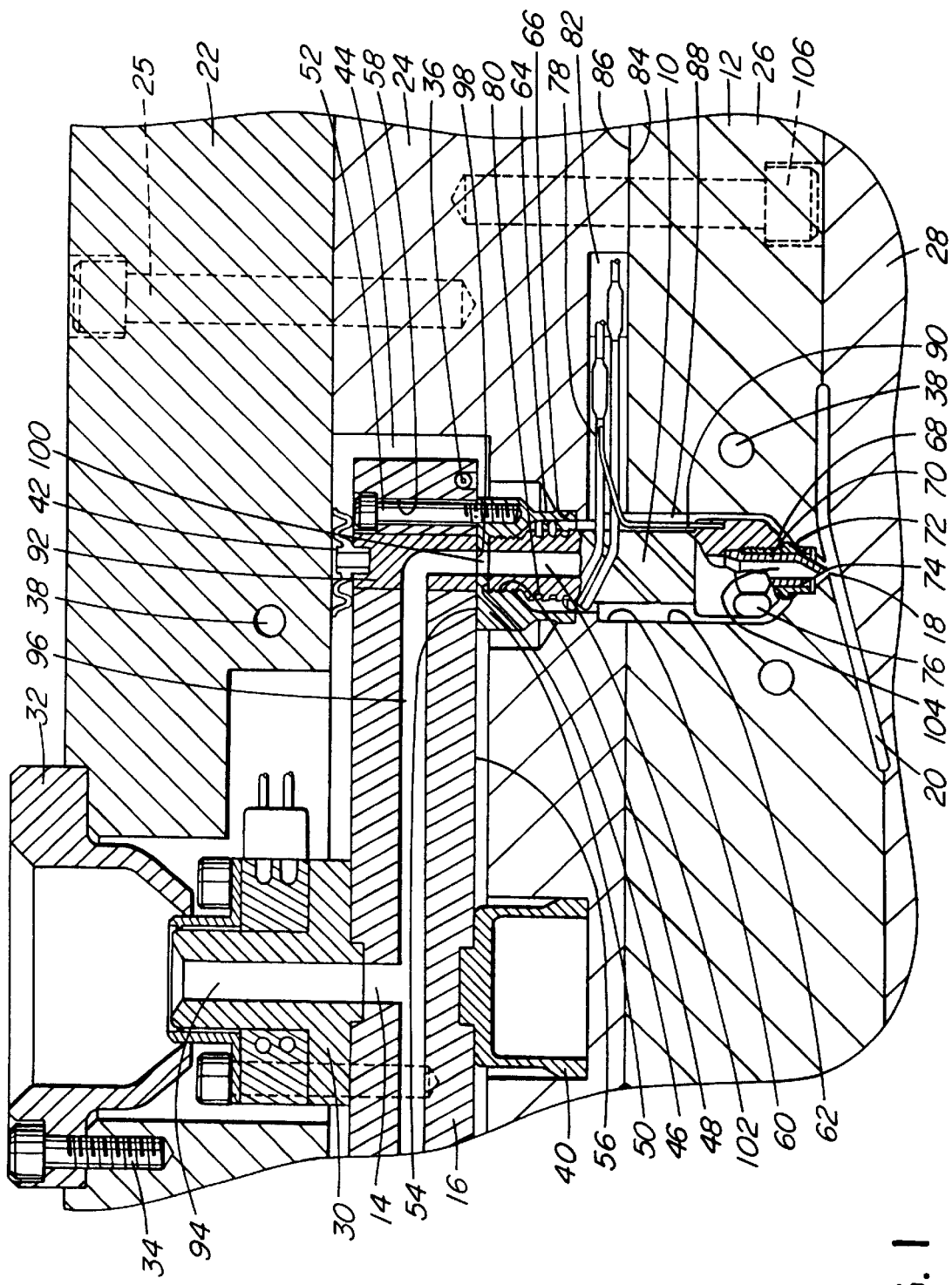
FIG. 1 is a sectional view of a portion of a multi-nozzle injection molding apparatus wherein each heated nozzle is screwed into a mounting base attached to the melt distribution manifold according to a preferred embodiment of the invention.
Figure 2:
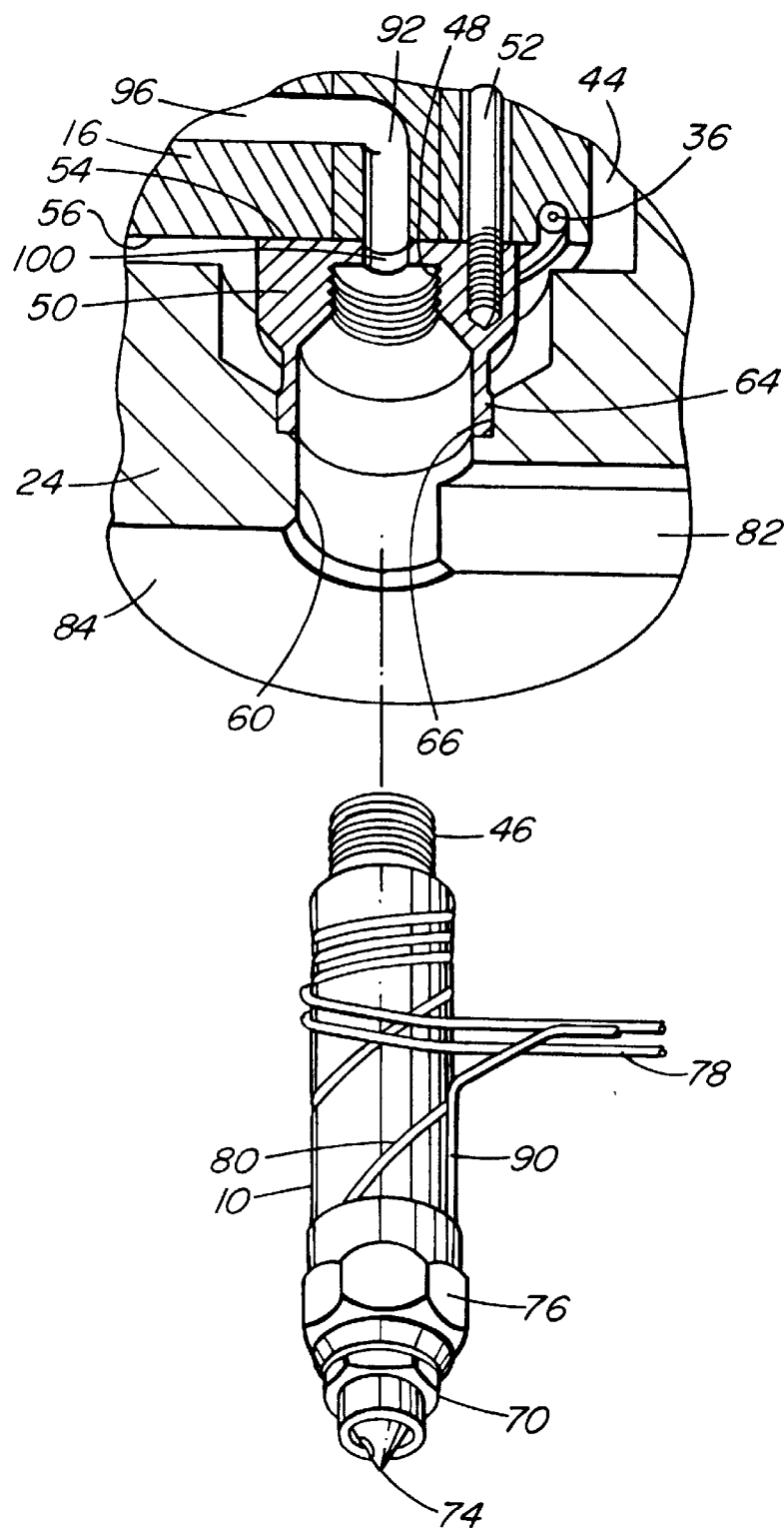
FIG. 2 is an isometric view showing how the heated nozzle is removed.

Reference is first made to FIG. 1 which shows a multi-nozzle injection molding apparatus or system wherein a number of heated steel nozzles 10 are mounted in a mold 12 to convey melt from a melt passage 14 in an elongated heated steel melt distribution manifold 16 to gates 18, each of which lead to a cavity 20. While only a single heated nozzle 10 is shown for ease of illustration, normally this type of apparatus will have a larger number of heated nozzles 10 extending forwardly in the mold from the heated elongated melt distribution manifold 16. Similarly, while the mold 12 can have a greater number of plates depending upon the application, in this case, only a rear back plate 22 and a manifold plate 24 secured together by bolts 25, as well as cavity plate 26 and a core plate 28 are shown for ease of illustration.

The melt distribution manifold 16 has a heated inlet portion 30 which is surrounded by a locating ring 32 secured to the top clamp plate 22 by screws 34. The melt distribution manifold 16 is heated by an integral electrical heating element 36 and the surrounding mold 12 is cooled by pumping a cooling fluid such as water through cooling channels 38. The melt distribution manifold 16 is mounted between the rear back plate 22 and the manifold plate 24 by a central manifold locator 40 and a number of pressure discs 42 to provide an insulative air space 44 between the heated melt distribution manifold 16 and the surrounding cooled mold 12.

Each heated nozzle 10 has a threaded rear end 46 which screws into a threaded seat or socket 48 in a mounting base 50 according to the invention. In this embodiment, the mounting base 50 is secured by screws 52 extending through holes 58 through the melt distribution manifold 16 with its rear end 54 abutting against the front face 56 of the melt distribution manifold 16. Each heated nozzle 10 extends from the Mounting base 50 forwardly through an opening 60 through the manifold plate 24 into an opening 62 in the cavity plate 26 extending to one of the gates 18 leading to a cavity 20. Each of the mounting bases 50 has a forwardly extending circular flange portion 64 which is received in a circular seat 66 extending around the opening 60 in the manifold plate 24 to locate the rear end 46 of the heated nozzle 10. In this embodiment, the front end 68 of heated nozzle 10 is located by a two-piece nozzle seal 70 which is screwed into the front end 68 of the heated nozzle 10 and extends forwardly into a seat 72 in the cavity plate 26 to ensure the tip end 74 of the nozzle seal 70 is accurately aligned with the gate 18. Thus, the heated nozzles 10 are very accurately secured in place.

With the heated nozzle 10 secured in this position, there is an insulative air space 88 between it and the surrounding cooled mold 12. Each heated nozzle 10 has a nut-like portion 76 which is engageable by a suitable tool (not shown) to tighten it into or loosen it out of the threaded seat or socket 48 in the mounting base 50. Each heated nozzle 10 also has wires 78 from an integral heating element 80 extending through a channel 82 in the front face 84 of the manifold plate 24. In the embodiment shown, a thermocouple element 90 also extends through the channel 82 and the air space 88 and into the nozzle 10 to control the operating temperature.

The melt passage 14 in the melt distribution manifold 16 extends outwardly from an inlet portion 94 in the inlet portion 30 of the melt distribution manifold 16 through a number of branches 96. Each branch 96 extends through an insert or plug 92 to an outlet 98 on the front face 56 of the melt distribution manifold 16. Each mounting base 50 has a melt bore 100 extending rearwardly therethrough from the threaded seat or socket 48 to its rear end 54. The melt bore 100 is the same size and is in alignment with one of the outlets 98 from the melt passage 92 in the melt distribution manifold 16. Each heated nozzle 10 also has a matching central melt bore 102 which is aligned with the melt bore 100 through the mounting base 50 and a melt bore 104 through the two-piece seal 70.

If it is necessary to remove one or more of the heated nozzles 10 for cleaning or replacement, the mold 12 is opened and the cavity plate 26 is removed by unscrewing bolts 106. As can be seen, this exposes the front ends 68 and the nut-like portions 76 of the heated nozzles 10. Thus, the provision of the mounting bases 50 with the threaded seats or sockets 48 according to the invention allow any of the heated nozzles 10 to be easily removed without removing the manifold plate 24 by unscrewing it from the socket 48 with a wrench and then cleaned or replaced by a new one.

In use, the system is assembled as shown. Electrical power is applied to the electrical heating elements 36, 80 in the melt distribution manifolds 16 and the heated nozzles 10 to heat the melt distribution manifolds 16 and the heated nozzles 10 to a predetermined operating temperature. Pressurized melt is then applied from a molding machine (not shown) to the inlet portion 94 of the melt passage 92 according to a predetermined injection cycle. The melt flows through the heated nozzle 10, mounting bases 50, and gates 18 into the cavity or cavities 20. After the cavity 20 is filled and a suitable packing and cooling period has expired, injection pressure is released. The mold 12 is then opened to eject the molded product. After ejection, the mold 12 is closed and the cycle is repeated continuously every 15 to 30 seconds with a frequency depending upon the wall thickness and the number and size of the cavities 20 and the exact material being molded.

While the description of the hot runner injection molding apparatus having the heated nozzles 10 screwed into threaded seats or sockets 48 in mounting bases 50 adjacent the melt distribution manifold 16 has been given with respect to a preferred embodiment, it will be evident that various modifications are possible without departing from the scope of the invention as understood by those skilled in the art and as defined in the following claims. For instance, the mounting bases 50 may be secured in place adjacent the melt distribution manifold 16 by means other than screws 52.

The embodiments of the invention in which an exclusive property or privilege is claimed is defined as follows:

1. In an injection molding apparatus having a heated melt distribution manifold (16) and a plurality of nozzles (10) mounted in a mold (12), each nozzle (10) having a threaded rear end (46) and a melt bore (102) extending therethrough to convey melt to a gate (18) leading to a cavity (20), the melt distribution manifold (16) having a front face (56) and a melt passage (14) extending therethrough, the melt passage (14) having a plurality of branches (96) extending outwardly from a common inlet portion (94) to an outlet (98) on the front face (56) of the melt distribution manifold (16) aligned with the melt bore (102) extending through one of the nozzles (10), the improvement comprising:

each nozzle (10) extending from a mounting base (50) having a rear end (54) secured against the front face of the melt distribution manifold (16), each mounting base (50) having a frontwardly open threaded seat (48) and a melt bore (100) extending rearwardly therethrough from the threaded seat (48) to the rear end (54), the rear end (46) of each nozzle (10) being screwed into the threaded seat (48) of one of the mounting bases (50) with the melt bore (100) through the mounting base (50) extending from one of the outlets (98) of the melt passage (14) to the aligned melt bore (102)extending through said nozzle (10).

2. An injection molding apparatus as claimed in claim 1 wherein each mounting base (50) is secured to the melt distribution manifold (16).

3. An injection molding apparatus as claimed in claim 2 wherein the mold (12) comprises at least a manifold plate (24) with a front surface (84) and a cavity plate (26) with a rear surface (86), the front surface (84) of the manifold plate (24) abuts against the rear surface (86) of the cavity plate (26), each nozzle (10) extends forwardly through an opening (60) through the manifold plate (24), and each mounting base (50) has a circular flange portion (64) extending forwardly into a circular seat (66) extending around said opening (60) through the manifold plate (24).

4. An injection molding apparatus as claimed in claim 3 wherein each nozzle (10) has a portion (76) engageable by a tool.

5. An injection molding apparatus as claimed in claim 4 wherein a channel is provided in at least one of the front surfaces (84) of the manifold plate (24) and the rear surface (86) of the cavity plate (26) in which to run wires (78) to each nozzle (10).

6. An injection molding apparatus as claimed in claim 1 wherein each nozzle (10) has a heating element (80).

7. An injection molding apparatus comprising a heated mold manifold (16) including a melt channel portion (92), a mounting base (50) securely attached solely to said manifold (16) by a fastener (52) partially located in said manifold (16) having a threaded portion (48) and a melt channel portion (100) in alignment with melt channel portion (92) of the manifold, and an injection nozzle (10) having a threaded end portion (46) and a melt channel (48), whereby said injection nozzle (10) is connected to said mounting base (50) via its threaded portion (46) so that melt channel (48) is in alignment with melt channel portion (100) of said mounting base (50) and with the melt channel portion (92) of the manifold (16) during the thermal expansion of said manifold (16) due to heating.

8. An injection molding apparatus according to claim 7 where said mounting base (50) further includes flange portion (64) which is received in a circular seat (66).

9. An injection molding apparatus comprising a mold manifold (16) including a melt channel portion (92), an injection nozzle (10) having a threaded end portion (46) and a melt channel (48), a mounting base (50) located entirely between said manifold (16) and said injection nozzle (10), said mounting base having a threaded portion (48) and a melt channel portion (100) in alignment with melt channel portion (92) of the manifold, whereby said injection nozzle

(10) is connected to said mounting base (50) via its threaded portion (46) so that melt channel (48) is in alignment with melt channel portion (100) of said mounting base (50) and with the melt channel portion (92) of the manifold (16) during the thermal expansion of said manifold (16) due to heating and whereby said mounting base (50) is securely and solely attached to said manifold (16) via a fastener (52) partially located in said manifold (16).

10. An injection molding apparatus according to claim 9 where said mounting base (50) further includes flange portion (64) which is received in a circular seat (66).

11. An injection molding apparatus comprising a heated mold manifold (16) including a melt channel portion (92), a mounting base (50) having a threaded portion (48) and a melt channel portion (100) in alignment with melt channel portion (92) of the manifold, and an injection nozzle (10) having a threaded end portion (46) and a melt channel (48), said injection nozzle (10) being connected to said mounting base (50) via threaded portion (46) whereby said mounting base (50) is securely and solely attached to said manifold (16) by a fastener (52) partially located in said manifold (16).

12. An injection molding apparatus according to claim 11 where the mounting base (50) is entirely located between said manifold (16) and said nozzle (10).

13. An injection molding apparatus according to claim 11 where said mounting base (50) further includes flange portion (64) which is received in a circular seat (66).

* * * * *